US012035367B2

(12) United States Patent
Aldana et al.

(10) Patent No.: US 12,035,367 B2
(45) Date of Patent: Jul. 9, 2024

(54) CHANNEL SENSING INDICATION WHEN COT SHARING IN NR SYSTEMS OPERATING IN UNLICENSED SPECTRUM

(71) Applicant: Apple Inc., Cupertino, CA (US)

(72) Inventors: Carlos H. Aldana, Santa Clara, CA (US); Yongjun Kwak, Portland, OR (US); Yingyang Li, Beijing (CN); Salvatore Talarico, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/365,112

(22) Filed: Aug. 3, 2023

(65) Prior Publication Data

US 2023/0397252 A1 Dec. 7, 2023

Related U.S. Application Data

(63) Continuation of application No. 17/949,983, filed on Sep. 21, 2022, which is a continuation of application
(Continued)

(51) Int. Cl.
*H04W 72/12* (2023.01)
*H04W 74/0808* (2024.01)

(52) U.S. Cl.
CPC ....... *H04W 74/0808* (2013.01); *H04W 72/12* (2013.01)

(58) Field of Classification Search
CPC ........................... H04W 72/12; H04W 74/0808
(Continued)

(56) References Cited

U.S. PATENT DOCUMENTS

2011/0051706 A1 3/2011 Schmidl et al.
2017/0086226 A1 3/2017 Wang
(Continued)

FOREIGN PATENT DOCUMENTS

CN 109417823 A 3/2019
CN 109479318 A 3/2019
(Continued)

OTHER PUBLICATIONS

Office Action received for European Application No. 20729314.3, mailed on Oct. 17, 2023, 6 pages.
(Continued)

*Primary Examiner* — Angel T Brockman
(74) *Attorney, Agent, or Firm* — Womble Bond Dickinson (US) LLP

(57) ABSTRACT

Methods and apparatus are disclosed for a UE and its serving base station in 5G NR systems to signal channel scan or channel sensing to allow channel occupancy time (COT) sharing before transmissions. The COT sharing may be initiated by the base station or by the UE by asserting a CCA indication to enable channel sensing by a UE or base station, respectively. When the UE receives and decodes the asserted CCA indication during downlink transmission, the UE may perform channel sensing during a short interframe space (SIFS) between the downlink transmission and a scheduled uplink transmission. When the UE detects that the sensed RF energy across an intended transmission band is greater than an energy detect threshold, the UE may refrain from transmitting during the scheduled uplink transmission. Otherwise or when the CCA indication is de-asserted, the UE may transmit during the scheduled uplink transmission without performing channel sensing.

20 Claims, 9 Drawing Sheets

Related U.S. Application Data

No. 16/865,197, filed on May 1, 2020, now Pat. No. 11,457,474.

(60) Provisional application No. 62/842,370, filed on May 2, 2019.

(58) Field of Classification Search
USPC .................................................. 370/329
See application file for complete search history.

(56) References Cited

U.S. PATENT DOCUMENTS

| | | |
|---|---|---|
| 2018/0027582 A1 | 1/2018 | Yerramalli et al. |
| 2018/0227936 A1 | 8/2018 | Yerramalli et al. |
| 2018/0235005 A1 | 8/2018 | Ansari et al. |
| 2020/0351941 A1 | 11/2020 | Aldana et al. |

FOREIGN PATENT DOCUMENTS

| | | |
|---|---|---|
| WO | 2017/191617 A1 | 11/2017 |
| WO | 2018017187 A1 | 1/2018 |

OTHER PUBLICATIONS

European Search Report and Search Opinion received for European Application No. 23198601.9, mailed on Jan. 8, 2024, 10 pages.
Ericsson: "On CWS adjustment based on HARQ-ACK feedback", 3GPP Draft; R1-156034, 3rd Generation Partnership Project (3GPP), Mobile Competence Centre ; 650, Route Des Lucioles ; F-06921 Sophia-Antipolis Cedex ; France—vol. RAN WGI, No. Malmo, Sweden; Oct. 5, 2015-Oct. 9, 2015Oct. 4, 2015 (Oct. 4, 2015), XP051039803, Retrieved from the Internet:URL:http://www.3gpp. org/ftp/Meetings -3GPP-SYNC/RANI/Docs/ [retrieved on Oct. 4, 2015].
Huawei et al: "Contention window size adjustment for UL category 4 LBT for eLAA" 3Gpp Draft; R1-162129, 3rd Generation Partnership Project (3GPP), Mobile Competence Centre; 650, Route Des Lucioles; F-06921 Sophia-Antipolis Cedex; France vol. RAN WGI, No. Busan, Korea; Apr. 11, 2016-Apr. 15, 2016 Apr. 2, 2016 (Apr. 2, 2016), XP051079976, Retrieved from the Internet: URL:http://www.3gpp.org/ftp/tsg_ran/WG1_RL1/TSGRI 84b/Docs/ [retrieved on Apr. 2, 2016].
International Preliminary Report on Patentability received for PCT Application No. PCT/IB2017/052646, dated Sep. 29, 2017, 4 pages.
International Preliminary Report on Patentability received for PCT Patent Application No. PCT/US20/31362, mailed on Nov. 11, 2021, 9 pages.
International Search Report and Written Opinion received for PCT Patent Application No. PCT/US20/31362, mailed on Jul. 29, 2020, 11 pages.
Mediatek Inc: "eLAA uplink channel access", 3GPP Draft; RI-165120 ELAA Channel Access, 3rd Generation Partnership Project (3GPP), Mobile Competence Centre ; 650, Route Des Lucioles ; F-06921 Sophia-Antipolis Cedex ; France •vol. RAN WGI, no. Nanjing, China; May 23, 2016-May 27, 2016May 14, 2016 (May 14, 2016), XP051089841, Retrieved from the Internet:URL:http://www.3gpp. org/ftp/lsg-ran/WGI -Rl 1/TSGRI 85/Docs/[retrieved on May 14, 2016].
Sharp: "LAA contention window size adjustment with HARQ-ACK", 3GPP Draft; RI-155566, 3rd Generation Partnership Project (3GPP), Mobile Competence Centre ; 650, Route Des Lucioles ; F-06921 Sophia-Antipolis Cedex ; France vol. RAN WGI, No. Malmo, Sweden; Oct. 5, 2015-Oct. 9, 2015Oct. 4, 2015 (Oct. 4, 2015), XP051039693, Retrieved from the Internet: URL:http://www.3gpp.org/ftp/Meetings -3GPP-SYNC/RANI/Docs/ [retrieved on Oct. 4, 2015].
Chinese Office Action received in related Chinese Application No. 202080041165.7, mailed Mar. 16, 2024, 17 pages.

CHANNEL SENSING INDICATION WHEN COT SHARING IN NR SYSTEMS OPERATING IN UNLICENSED SPECTRUM

CROSS REFERENCE TO RELATED APPLICATION

This application claims the benefit of U.S. application Ser. No. 17/949,983 filed on Sep. 21, 2022, which is a Continuation of U.S. application Ser. No. 16/865,197 filed on May 1, 2020, which claims the benefit of U.S. Provisional Application No. 62/842,370 filed on May 2, 2019, the disclosure of which is incorporated herein by reference in its entirety.

TECHNICAL FIELD

This disclosure relates to the field of wireless communication, and more specifically, to methods that enable wireless communication devices operating in licensed spectrum to operate in unlicensed spectrum. Other aspects are also described.

BACKGROUND

As the number of mobile devices connected to wireless networks and the demand for mobile data traffic continue to increase, changes are made to system requirements and architectures to meet these demands. Three critical areas that may be enhanced in order to deliver the increase in data traffic are larger bandwidth, lower latency, and higher data rates. One limiting factor when attempting to increase system bandwidth, and with wireless innovation in general, is the availability of wireless spectrum. To mitigate the limited availability of licensed spectrum, the use of unlicensed or shared spectrum has been an area of interest to expand the bandwidth of wireless communication networks such as 5G new radio (NR) or 4G Long Term Evolution (LTE) systems. For example, one major enhancement for LTE has been to enable operation in the unlicensed spectrum via Licensed-Assisted Access (LAA), which expands the system bandwidth by utilizing the flexible carrier aggregation (CA) framework introduced by the LTE-Advanced system.

As the main building blocks for the 5G NR system are being established, one natural enhancement is to allow the 5G NR system to also operate in unlicensed spectrum. System considerations to enable the NR system to operate in unlicensed spectrum may include the design of physical channels to avoid unnecessary divergence from operations using licensed spectrum, initial channel access and radio-link monitoring, coexistence within NR systems and between NR systems operating in unlicensed spectrum and other incumbent radio access technologies (RATs) in accordance with regulatory requirements. For example, when operating in the unlicensed 5 GHz band, a listen-before-talk (LBT) procedure may need to be performed in some parts of the world to acquire the medium before a transmission can occur. To allow more efficient use of the medium, other techniques such as channel occupancy time (COT) sharing may allow two devices to share the medium without having to perform LBT every time the medium is accessed. Conventionally, COT sharing may be performed by an access point (AP) and a user station (STA) of a WiFi system by sending a data packet and determining whether an acknowledgement (ACK) frame is received after a short interframe space (SIFS) duration without performing LBT. Because the duration of the transmissions in 5G NR is generally much longer than that of Wi-Fi, there is a need to improve channel sensing mechanism to allow devices in 5G NR to acquire, access, and share unlicensed spectrum using the COT sharing technique.

SUMMARY

To maintain coexistence with other incumbent technologies while operating in unlicensed spectrum bands, devices of the 5G NR system may implement mechanisms to verify that the channels in the unlicensed spectrum bands are free from interference before the devices acquire and access the channels. For example, a device may perform the LBT procedure to scan the channels to ascertain that no other devices are already transmitting on the channels before the device starts its own transmission. The channel scan in the LBT procedure may be performed with or without a random back-off when channel activity is detected. To allow more efficient use of the channels, channel occupancy time (COT) sharing may enable two devices to share the channels without having to perform LBT with a random back-off every time the channels are accessed. In 5G NR systems, the durations of the transmissions may be long compared to those found in other wireless systems such as WiFi. Disclosed are systems and methods on how channel scan or channel sensing may be signaled between 5G NR devices to allow COT sharing before long transmissions may occur.

A method for a first device of a wireless communication network to perform channel sensing to allow COT sharing of unlicensed spectrum is disclosed. The method includes the first device generating a clear channel assessment (CCA) indication. The CCA indication indicates whether a second device of the wireless communication network is instructed to perform channel sensing to detect an energy level in a transmission channel during an interval between a first transmission period and a second transmission period. The first transmission period is used by the first device to transmit to the second device. The second transmission period is used by the second device to transmit to the first device. The method also includes the first device transmitting the CCA indication to the second device during the first transmission period. In one embodiment, the CCA indication may instruct the second device to perform channel sensing during the short interframe space (SIFS) between a downlink transmission and a scheduled uplink transmission or vice versa A method for a first device of a wireless communication network to perform channel sensing to allow COT sharing of unlicensed spectrum is disclosed. The method includes the first device decoding the CCA indication received from a second device of the wireless communication network during a first transmission period and determining whether the CCA indication indicates channel sensing. If the CCA indication is asserted, the first device performs channel sensing to detect an energy level in a transmission channel during an interval between the first transmission period and a second transmission period. The first device determines whether the detected energy level exceeds an energy detect threshold. If the detected energy level is equal to or greater than the energy detect threshold, the first device refrains from transmitting to the second device during the second transmission period. Otherwise, if the detected energy level is less than the energy detect threshold, the first device is allowed to transmit to the second device during the second transmission period. In one embodiment, the first device performs channel sensing during the short interframe space (SIFS) between a downlink transmission and a scheduled uplink transmission or vice versa.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
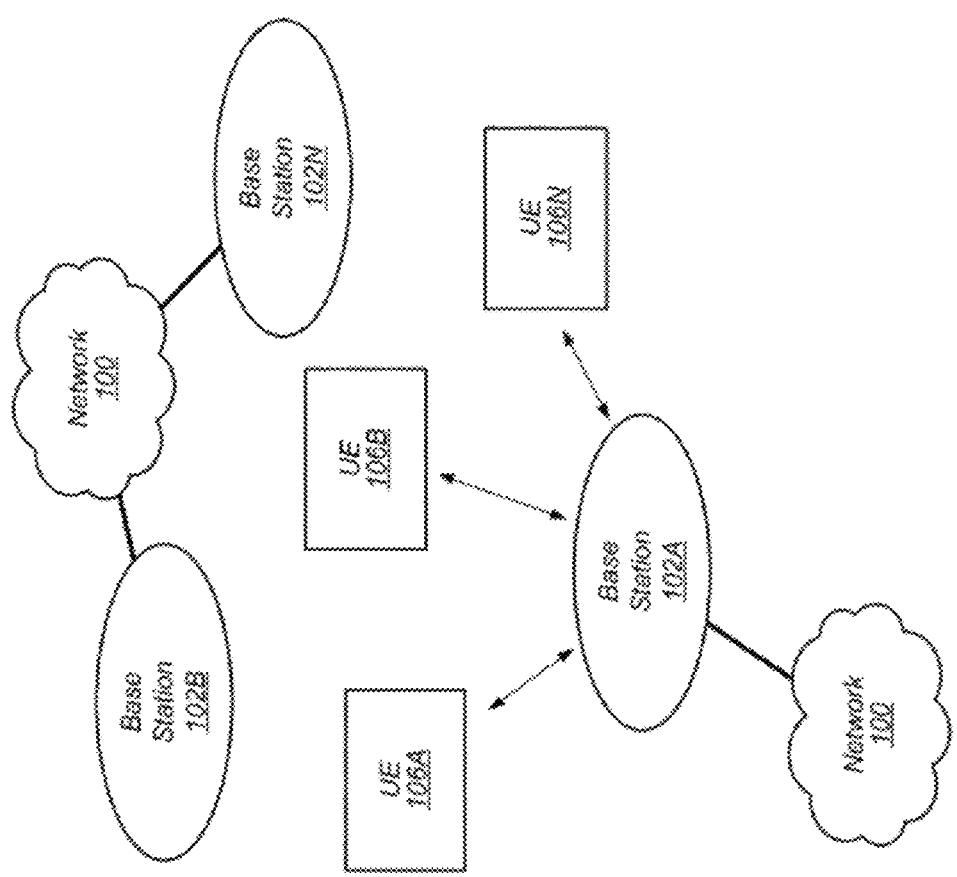
FIG. 1 illustrates an example wireless communication system in accordance with some embodiments of the disclosure.

Disclosed are techniques to operate 5G NR systems in unlicensed spectrum. The unlicensed spectrum may include bands below 6 GHz up to 52.6 GHz, for example in the 5 GHz, 37 GHz, or 60 GHz bands. System design considerations to enable the 5G NR system to operate in unlicensed spectrum may include the physical channels inheriting operational channel characteristics of the licensed spectrum such as duplex mode, waveform, carrier bandwidth, subcarrier spacing, frame structure, physical layer design, etc., to avoid unnecessary divergence. Other system design considerations may include initial access, channel access, and coexistence methods. In particular, 5G NR systems operating in unlicensed spectrum may need to coexist with 5G NR operation in licensed spectrum, LTE operation in unlicensed spectrum using Licensed-Assisted Access (LAA), and with other incumbent RATs in accordance with regulatory requirements. In one embodiment, the coexistence methods for unlicensed 5 GHz band in LTE-based LAA is assumed as the baseline for 5G NR operating in the 5 GHz band so that operation in unlicensed spectrum does not impact deployed WiFi services (e.g., data, video, and voice services) more than an additional WiFi network on the same carrier.

In one embodiment, to operate in the unlicensed spectrum, the UE or the base station may perform medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol. The medium may refer to spectrum, frequency, wavelength, channels, and/or other medium for wireless communication. The UE or the base station may sense the medium and transmit when the medium is sensed to be idle (or when a specific channel in the medium is sensed to be unoccupied). The medium sensing operation may include clear channel assessment (CCA), which utilizes at least energy detect (ED) to determine the presence or absence of other signals on a channel in order to determine if a channel is occupied or clear. The LBT protocol allows wireless networks to coexist with incumbent systems in the unlicensed spectrum and with other networks. ED may include sensing RF energy across an intended transmission band for a period of time and comparing the sensed RF energy to a predefined or configured threshold.

The LBT protocol may include CAT2 LBT, which is LBT without random back-off, or CAT 4 LBT, which is equivalent to CAT2 LBT plus random back-off with a contention window of variable size. In one embodiment, channel occupancy time (COT) sharing in 5G NR allows for two devices to share the medium without having to perform CAT4 LBT every time the medium is accessed. This may allow for more efficient use of the medium. For example, the base station (e.g., gNB) may share the COT with the UE and vice-versa. Because durations of the transmissions in 5G NR may be long, the gNB or the UE may sense the channel before allowing such long transmissions to occur. Disclosed are mechanisms on how channel sensing may be signaled between two devices so as to allow COT sharing for the long transmissions. Embodiments of the disclosure include both UE-initiated and gNB-initiated COT sharing. While embodiments of the disclosure are illustrated using the gNB of 5G NR as the serving base station, features of the disclosure may be implemented by the eNodeB of the 4G LTE system or the base stations or access points of other types of wireless networks.

In one embodiment of a gNB-initiated COT sharing, the gNB asserts or de-asserts a CCA indication to enable or disable, respectively, channel sensing by the UE. The gNB may transmit the CCA indication inside the downlink channel information (DCI) used to schedule the uplink transmission by the UE. When the CCA indication is asserted, the UE may perform channel sensing during an interval between the downlink transmission and the scheduled uplink transmission, such as a short interframe space (SIFS). When the UE detects that the sensed RF energy across an intended transmission band is greater than an energy detect threshold, the UE may refrain from transmitting during the scheduled uplink transmission. Otherwise, the UE may transmit during the scheduled uplink transmission. If the CCA indication is de-asserted, the UE may transmit during the scheduled uplink transmission without performing channel sensing.

In one embodiment, the assertion or de-assertion of the CCA indication by the gNB may be determined based on the duration of the schedule uplink transmission. For example, if the scheduled uplink transmission is less than a threshold duration, the CCA indication may be de-asserted and the UE does not perform channel sensing prior to transmission. Otherwise, if the scheduled uplink transmission is greater than the threshold duration, the CCA indication is asserted and the UE performs channel sensing prior to transmission. In one embodiment, the UE may determine whether to perform channel sensing as a function of the duration of the uplink transmission frame when the CCA indication is asserted.

In one embodiment of a UE-initiated COT sharing, the UE asserts or de-asserts a CCA indication to enable or disable, respectively, channel sensing by the gNB. In one embodiment, the CCA indication may be determined by the gNB when the gNB configures the DCI used to schedule downlink transmission. In one embodiment, the UE may determine the CCA indication based on the duration of the downlink transmission or the CCA indication may be fixed. For example, if the scheduled downlink transmission is less than a threshold duration, the CCA indication may be de-asserted. Otherwise, if the scheduled downlink transmission is greater than the threshold duration, the CCA indication is de-asserted.

The UE may transmit the CCA indication during an uplink transmission. In one embodiment, the uplink transmission may be a scheduled uplink transmission. When the CCA indication is asserted, the gNB may perform channel sensing during an interval between the uplink transmission and the downlink transmission, such as a SIFS. When the gNB detects that the sensed RF energy across an intended transmission band is greater than an energy detect threshold, the gNB may refrain from transmitting during the downlink transmission. Otherwise, the gNB may transmit during the downlink transmission. If the CCA indication is de-asserted, the gNB may transmit during the downlink transmission without performing channel sensing. In one embodiment, the gNB may determine whether to perform channel sensing as a function of the duration of the downlink transmission frame when the CCA indication is asserted.

In one embodiment, because the transmit power of the gNB is usually greater than that of the UE, the UE may transmit to the gNB during an uplink transmission information of the UE transmit power. The gNB may adjust its transmit power so that the interference cause by the UE and the gNB to the unlicensed spectrum is on the same order.

In the following description, numerous specific details are set forth. However, it is understood that aspects of the disclosure here may be practiced without these specific details. In other instances, well-known circuits, structures and techniques have not been shown in detail in order not to obscure the understanding of this description.

The terminology used herein is for the purpose of describing particular aspects only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and "comprising" specify the presence of stated features, steps, operations, elements, or components, but do not preclude the presence or addition of one or more other features, steps, operations, elements, components, or groups thereof.

The terms "or" and "and/or" as used herein are to be interpreted as inclusive or meaning any one or any combination. Therefore, "A, B or C" or "A, B and/or C" mean any of the following: A; B; C; A and B; A and C; B and C; A, B and C." An exception to this definition will occur only when a combination of elements, functions, steps or acts are in some way inherently mutually exclusive.

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB.'

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
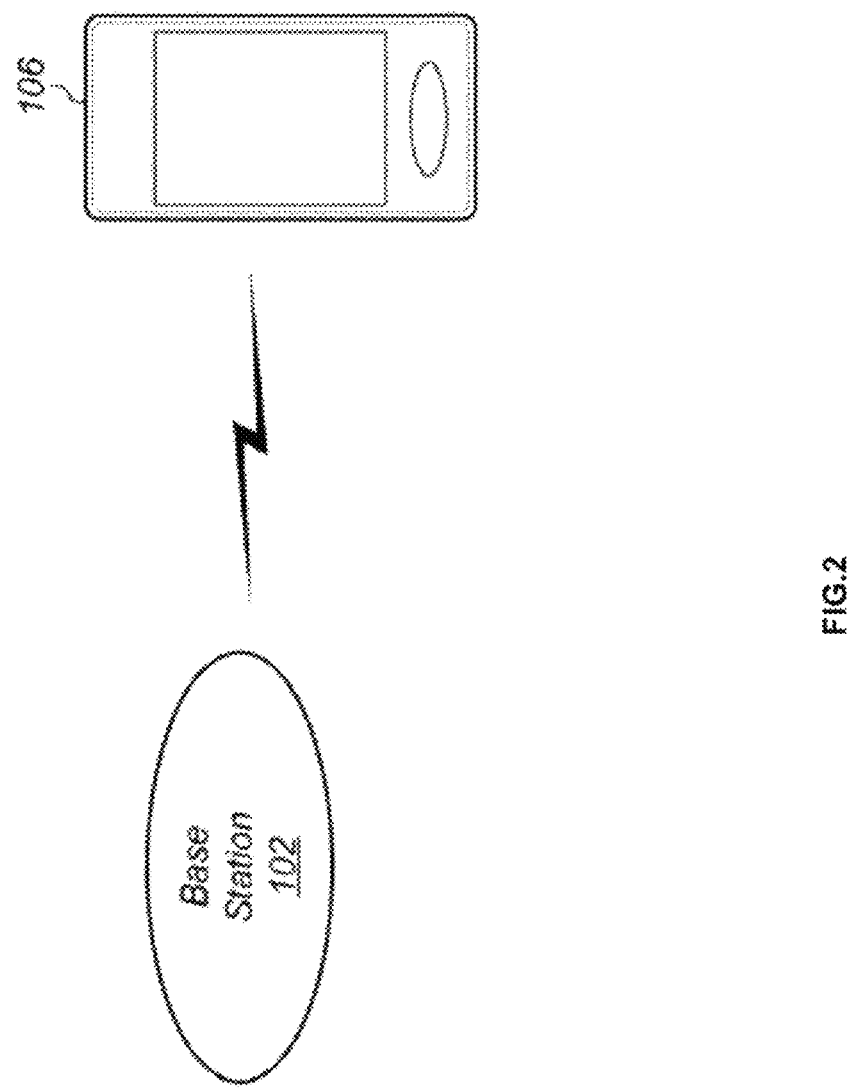
FIG. 2 illustrates a base station (BS) in communication with a user equipment (UE) device in accordance with some embodiments of the disclosure.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE or 5G NR using a single shared radio and/or GSM or LTE or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
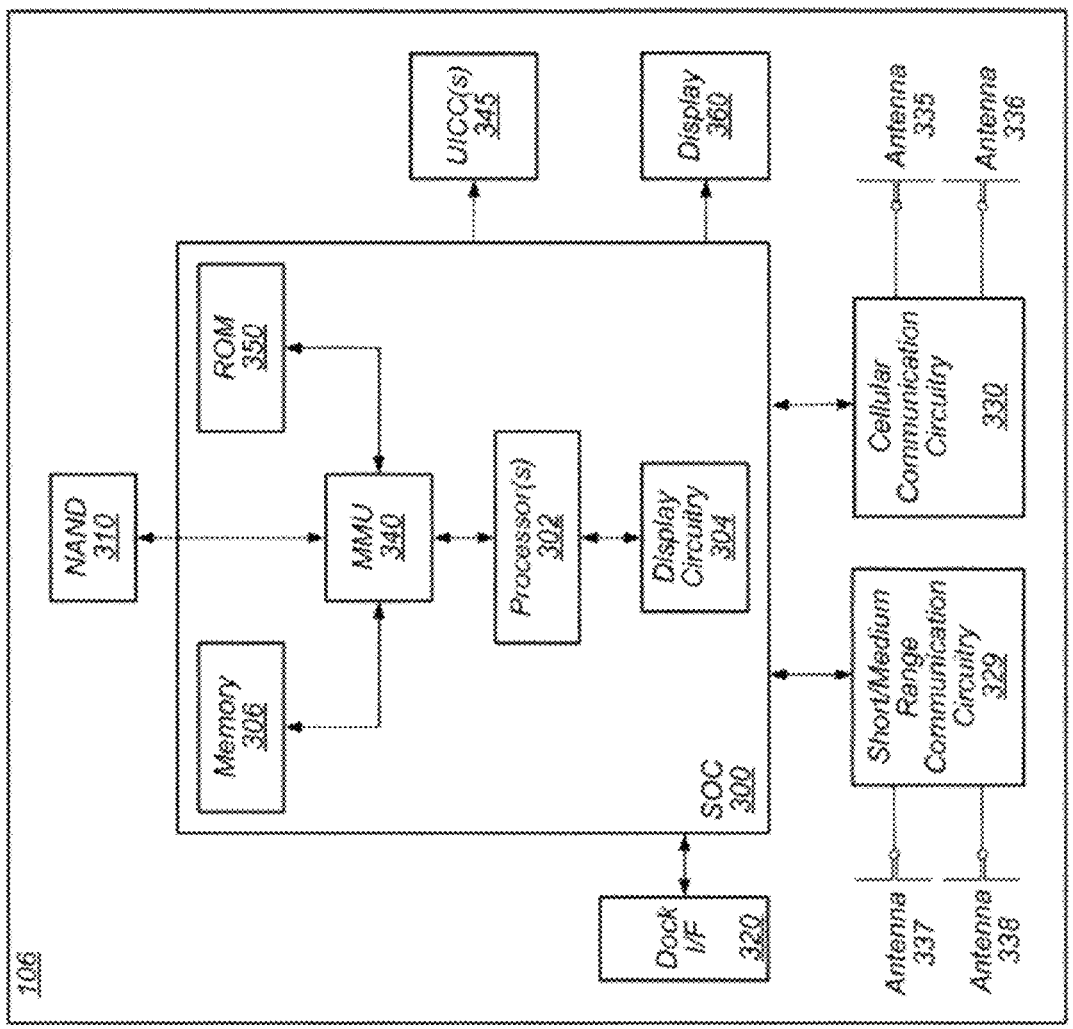
FIG. 3 illustrates an example block diagram of a UE in accordance with some embodiments of the disclosure.

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash memory 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively directly or indirectly, dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity with the first and second network nodes has been established.

As described herein, the communication device 106 may include hardware and software components for implementing the above features for time division multiplexing UL data for NSA (Non-Standalone) NR operations. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
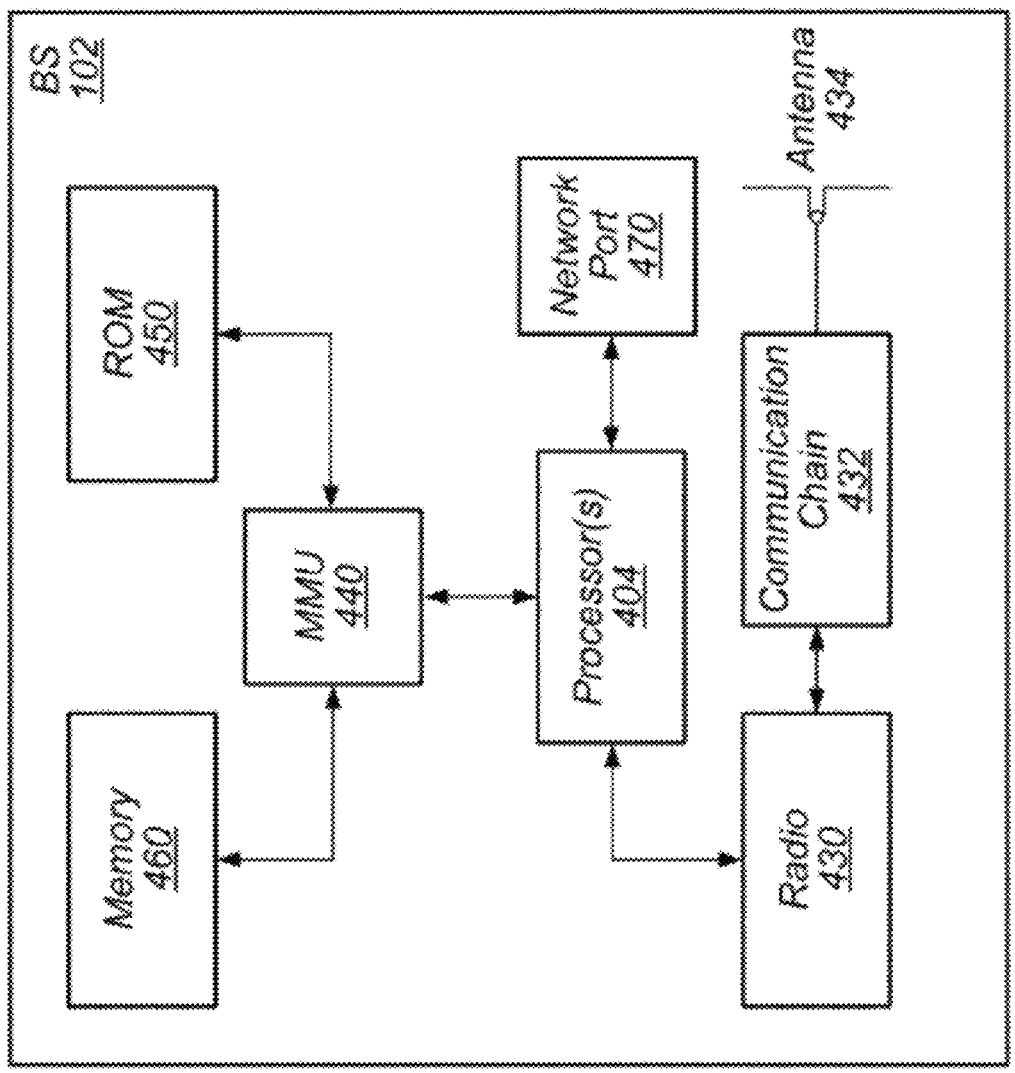
FIG. 4 illustrates an example block diagram of a BS in accordance with some embodiments of the disclosure.

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB's.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.). As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
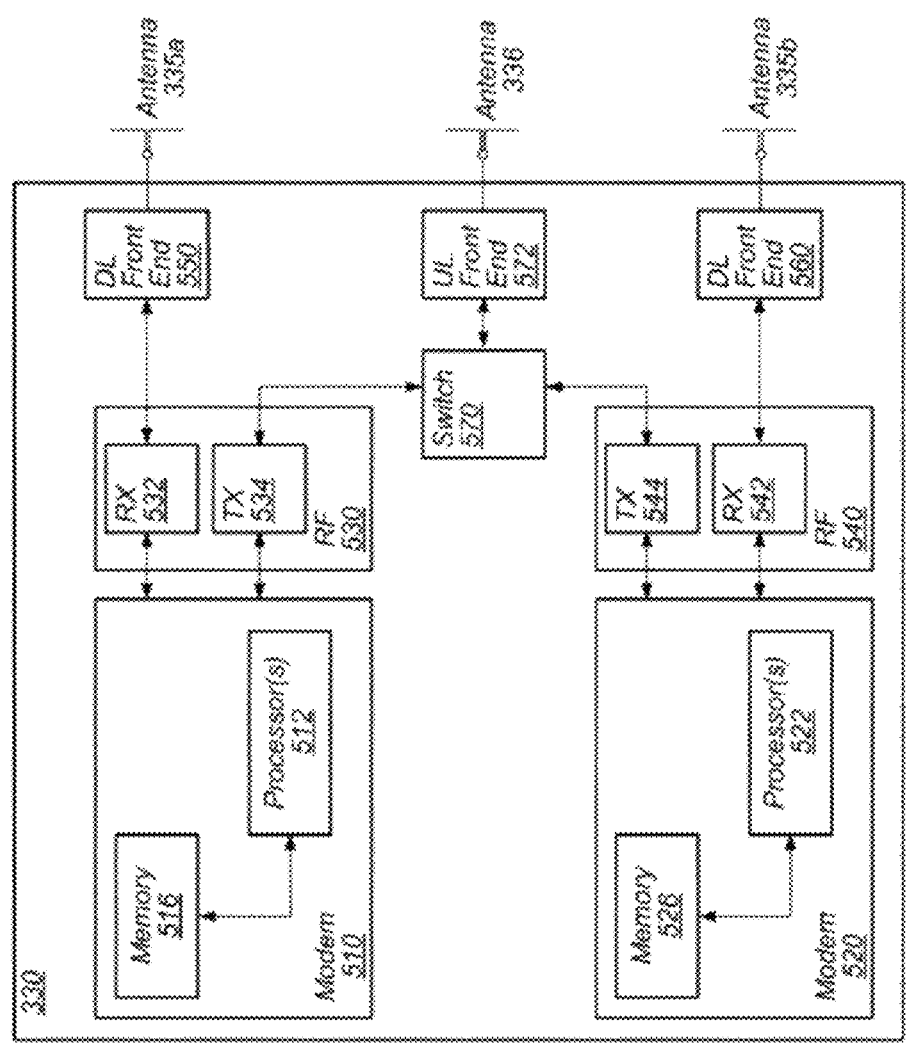
FIG. 5 illustrates an example block diagram of cellular communication circuitry in accordance with some embodiments of the disclosure.

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335 a-b and 336 as shown (in FIG. 3). In some embodiments, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335 a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335 *b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition), the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for time division multiplexing UL data for NSA NR operations, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition), the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6:
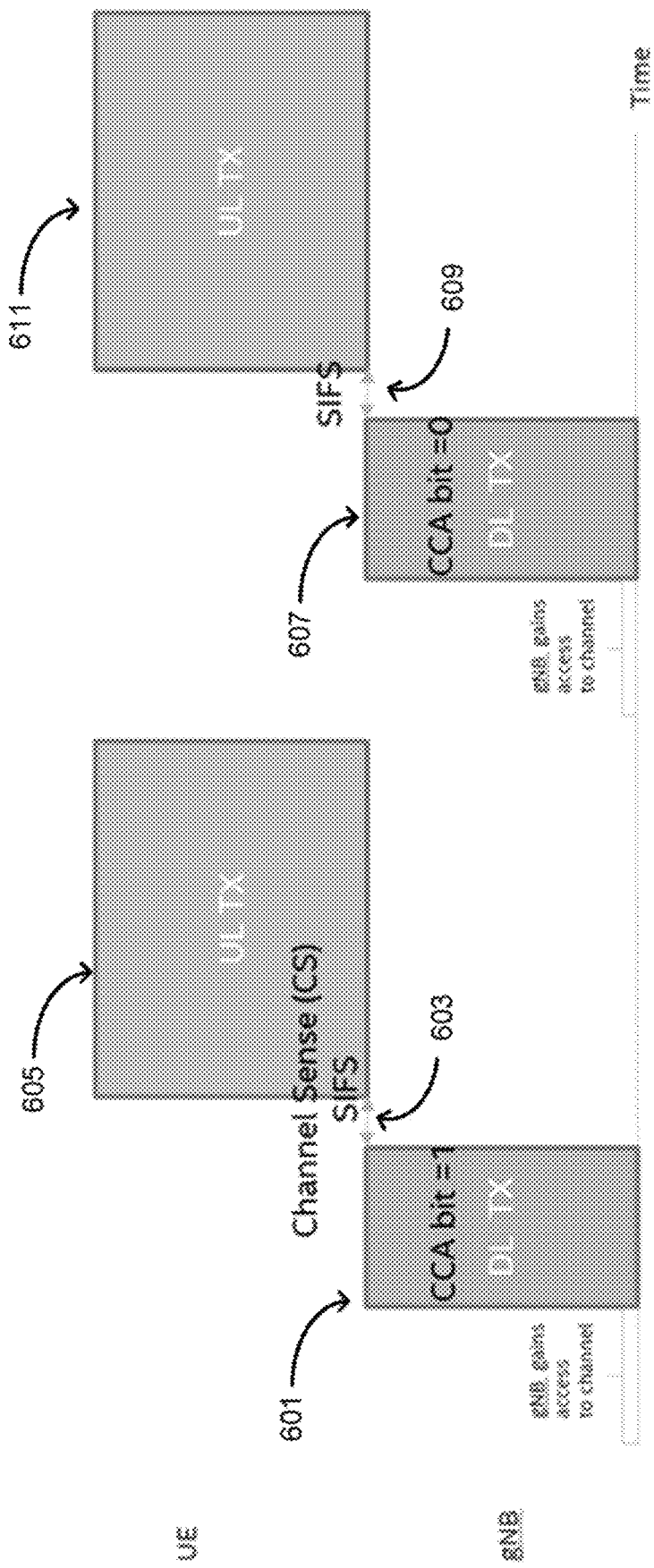
FIG. 6 illustrates a timeline of a BS-initiated COT in which the BS asserts or de-asserts a CCA indication to enable or disable, respectively, channel sensing by the UE during the SIFS interval before transmission by the UE in accordance with some embodiments of the disclosure.

FIG. 6 illustrates a timeline of a BS-initiated COT in which the BS asserts or de-asserts a CCA indication to enable or disable, respectively, channel sensing by the UE during the SIFS interval before transmission by the UE in accordance with some embodiments of the disclosure. The BS may be base station 102A, such as a gNB of 5G NR, and the UE may be UE 106 of FIG. 1.

The gNB may gain access to the channel of the unlicensed spectrum. At 601, the gNB may set the CCA indication to 1 during the downlink transmission (DL TX) to indicate to the UE to perform channel sensing before uplink transmission (UL TX) by the UE. In one embodiment, the gNB may transmit the CCA indication inside the downlink channel information (DCI) such as DCI 0_0 or DCI 0_1 used to schedule physical uplink shared channel (PUSCH).

In one embodiment, the assertion or de-assertion of the CCA indication by the gNB may be determined based on the duration of the schedule uplink transmission, which may be indicated by the DCI. For example, if the duration of the scheduled uplink transmission is less than a threshold duration, the CCA indication may be de-asserted to indicate to the UE not to perform channel sensing prior to transmission. Otherwise, if the duration of the scheduled uplink transmission is greater than the threshold duration, the CCA indication is asserted to indicate to the UE to perform channel sensing prior to uplink transmission. In one embodiment, the threshold duration may be fixed (e.g., 584 us) or may be configurable by the gNB or the UE.

In one embodiment, channel sensing may be implied by the duration of the scheduled uplink transmission even without the explicit configuration of the CCA indication by the gNB. For example, if the duration of the scheduled uplink transmission is less than the threshold duration, channel sensing is implicitly not required prior to transmission. Otherwise, if the duration of the scheduled uplink transmission is more than the threshold duration, channel sensing is implicitly required. In one embodiment, the UE may determine whether to perform channel sensing as a function of the duration of the uplink transmission frame when the CCA indication is asserted or regardless of whether the CCA indication is asserted.

In one embodiment, the gNB may de-assert the CCA indication if the CCA indication has already been asserted within a prior interval, such in the previous several milliseconds (ms). This may be done if the gNB receives one or more UL transmissions during such prior interval, indicating that there were no interferers in the prior interval, and it is assumed unlikely that there would be interferers for the scheduled uplink transmission.

The UE may decode the CCA indication received during the downlink transmission or may otherwise determine whether to perform channel sensing as a function of the duration of the scheduled uplink transmission. Because the CCA indication is asserted, at 603, the UE may perform channel sensing during an interval between the downlink transmission and the scheduled uplink transmission, such as during the SIFS interval. In one embodiment, the SIFS interval may be 16 us. The UE may perform channel sensing by listening to the channel intended for uplink transmission for a period of time, such as a single observation slot with a typical duration of 9 microseconds (us) within the SIFS interval. The UE may assess whether the detected RF energy level is above or below an energy detect (ED) threshold. The detected RF energy level indicates the presence or absence of other signals on the channel, thus indicating whether the channel is occupied or clear. In one embodiment, the ED threshold may be predefined or configured by the gNB or the UE. In one embodiment, the ED threshold may be set to −72 dBm.

When the UE detects that the sensed RF energy across an intended transmission band is greater than the ED threshold, the UE may refrain from transmitting during the scheduled uplink transmission. Otherwise, the UE may transmit during the scheduled uplink transmission at 605.

At 607, the gNB may gain access to the channel for a subsequent downlink transmission and may set the CCA indication to 0 to indicate to the UE not to perform channel sensing before uplink transmission by the UE. For example, if the duration of the scheduled uplink transmission is less than the threshold duration, the CCA indication may be de-asserted to indicate to the UE not to perform channel sensing prior to transmission. As discussed, in one embodiment, channel sensing may be implied by the duration of the scheduled uplink transmission even without the explicit configuration of the CCA indication by the gNB. For example, if the duration of the scheduled uplink transmission is less than the threshold duration, channel sensing is implicitly not required prior to transmission.

The UE may decode the CCA indication received during the downlink transmission or may otherwise determine whether to perform channel sensing as a function of the duration of the scheduled uplink transmission. Because the CCA indication is de-asserted, the UE does not perform channel sensing during the interval between the downlink transmission and the scheduled uplink transmission, such as during the SIFS interval at 609. The UE may then transmit during the scheduled uplink transmission at 611 without performing channel sensing. Thus, the UE does not execute the LBT protocol (CAT-1 LBT) prior to uplink transmission.

Figure 7:
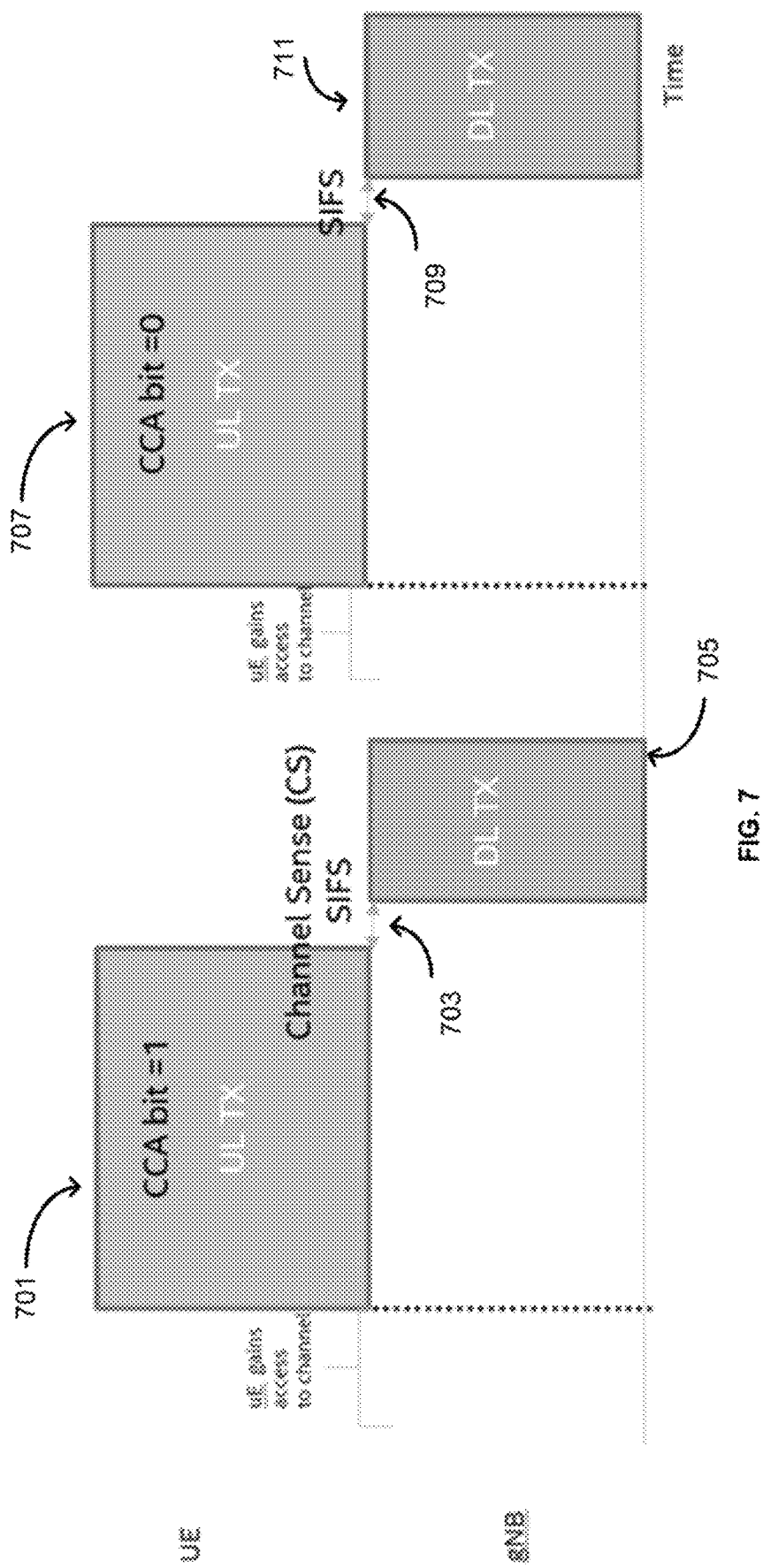
FIG. 7 illustrates a timeline for a UE-initiated COT in which the UE asserts or de-asserts a CCA indication to enable or disable, respectively, channel sensing by the BS during the SIFS interval before transmission by the BS in accordance with some embodiments of the disclosure.

FIG. 7 illustrates a timeline for a UE-initiated COT in which the UE asserts or de-asserts a CCA indication to enable or disable, respectively, channel sensing by the BS during the SIFS interval before transmission by the BS in accordance with some embodiments of the disclosure. The BS may be base station 102A, such as a gNB of 5G NR, and the UE may be UE 106 of FIG. 1.

The UE may gain access to the channel of the unlicensed spectrum. At 701, the UE may set the CCA indication to 1 during the uplink transmission (UL TX) to indicate to the gNB to perform channel sensing before downlink transmission (DL TX) by the gNB. In one embodiment, the uplink transmission may be a scheduled uplink transmission. In one embodiment, the CCA indication may be determined by the gNB when the gNB configures the DCI used to schedule physical downlink shared channel (PDSCH), such as DCI 1_1.

In one embodiment, the assertion or de-assertion of the CCA indication by the UE may be determined based on the duration of the schedule downlink transmission indicated by the DCI. For example, if the duration of the scheduled downlink transmission is less than a threshold duration, the CCA indication may be de-asserted to indicate to the gNB not to perform channel sensing prior to the scheduled downlink transmission. Otherwise, if the duration of the scheduled downlink transmission is greater than the threshold duration, the CCA indication is asserted to indicate to the gNB to perform channel sensing prior to the scheduled downlink transmission. In one embodiment, the threshold duration may be fixed or may be configurable by the gNB or the UE.

In one embodiment, channel sensing may be implied by the duration of the scheduled downlink transmission even without the explicit configuration of the CCA indication by the UE. For example, if the duration of the scheduled downlink transmission is less than the threshold duration, channel sensing is implicitly not required prior to the downlink transmission. Otherwise, if the duration of the scheduled downlink transmission is more than the threshold duration, channel sensing is implicitly required. In one embodiment, the gNB may determine whether to perform channel sensing as a function of the duration of the downlink transmission when the CCA indication is asserted or regardless of whether the CCA indication is asserted by the UE.

The gNB may decode the CCA indication received during the uplink transmission or may otherwise determine whether to perform channel sensing as a function of the duration of the scheduled downlink transmission. Because the CCA indication is asserted, at 703, the gNB may perform channel sensing during an interval between the uplink transmission and the scheduled downlink transmission, such as during the SIFS interval. In one embodiment, the SIFS interval may be 16 us. The gNB may perform channel sensing by listening to the channel intended for downlink transmission for a period of time, such as a single observation slot with a typical duration of 9 us within the SIFS interval. The gNB may assess whether the detected RF energy level is above or below an energy detect (ED) threshold.

When the gNB detects that the sensed RF energy across an intended transmission band is greater than the ED threshold, the gNB may refrain from transmitting during the scheduled downlink transmission. Otherwise, the gNB may transmit during the scheduled downlink transmission at 705.

At 707, the UE may gain access to the channel for a subsequent uplink transmission and may set the CCA indication to 0 to indicate to the gNB not to perform channel sensing before the next downlink transmission by the gNB. For example, if the duration of the scheduled downlink transmission is less than the threshold duration, the CCA indication may be de-asserted to indicate to the gNB not to perform channel sensing prior to the scheduled downlink transmission. As discussed, in one embodiment, channel sensing may be implied by the duration of the scheduled downlink transmission even without the explicit configuration of the CCA indication by the UE. For example, if the duration of the scheduled downlink transmission is less than the threshold duration, channel sensing is implicitly not required prior to the downlink transmission.

The gNB may decode the CCA indication received during the uplink transmission or may otherwise determine whether to perform channel sensing as a function of the duration of the scheduled downlink transmission. Because the CCA indication is de-asserted, the UE does not perform channel sensing during the interval between the uplink transmission and the scheduled downlink transmission, such as during the SIFS interval at 709. The gNB may then transmit during the scheduled downlink transmission at 611 without performing channel sensing. Thus, the gNB does not execute the LBT protocol (CAT-1 LBT) prior to downlink transmission.

In one embodiment, because the transmit power of the gNB is usually greater than that of the UE, the UE may transmit to the gNB during the uplink transmission at 701 or 707 information on the UE transmit power. The gNB may adjust its transmit power during the downlink transmission at 705 or 711 so that the interference cause by the UE and the gNB to the unlicensed spectrum is on the same order.

Figure 8:
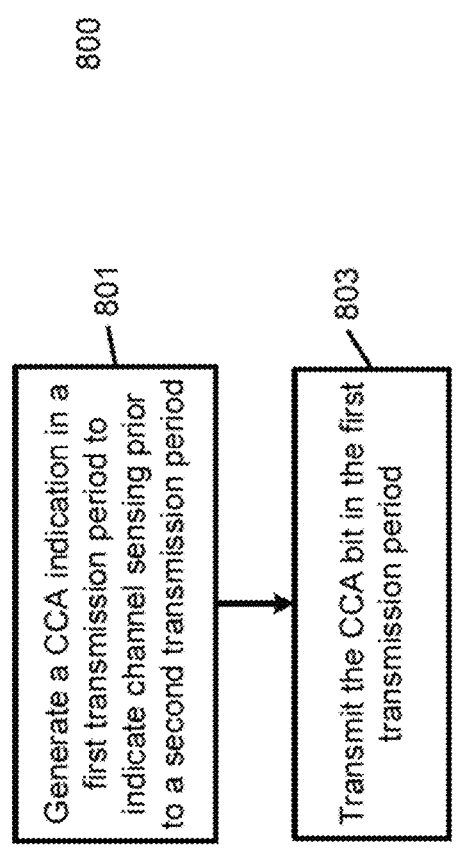
FIG. 8 is a flow diagram illustrating an example of a method for a device to generate and transmit a CCA indication in a first transmission period to enable a second device to perform channel sensing in accordance with some embodiments of the disclosure.

FIG. 8 is a flow diagram illustrating an example of a method 800 for a device to generate and transmit a CCA indication in a first transmission period to enable a second device to perform channel sensing in accordance with some embodiments of the disclosure. Method 800 may be performed by processing logic which may include software, hardware, or a combination thereof. For example, method 800 may be performed by processors 302 or cellular communication circuitry 330 of the UE 106, or by processors 404 of the base station 102 (e.g., gNB), such as described in conjunction with FIGS. 1-5.

At operation 801, the device generates a CCA indication in a first transmission period to indicate channel sensing prior to a second transmission period. In one embodiment, device may be the gNB, the first transmission period may be a downlink transmission from the gNB to the UE during a gNB-initiated COT sharing, and the second transmission period may be an uplink transmission from the UE to the gNB. In one embodiment, the device may be the UE, the first transmission period may be an uplink transmission from the UE to the gNB during a UE-initiated COT sharing, and the second transmission period may be a downlink transmission from the gNB to the UE. In one embodiment, the assertion or de-assertion of the CCA indication by the device may be determined based on the duration of the scheduled transmission in the second transmission period. For example, if the duration of the scheduled transmission in the second transmission period is less than a threshold duration, the CCA indication may be de-asserted to indicate to the second device not to perform channel sensing prior to the scheduled transmission. Otherwise, if the duration of the scheduled uplink transmission is greater than the threshold duration, the CCA indication is asserted to indicate to the second device to perform channel sensing prior to the scheduled transmission.

At operation 803, the device transmits the CCA indication to second device during the first transmission period. In one embodiment, during gNB-initiated COT sharing, the gNB may transmit the CCA indication inside the DCI used to schedule PUSCH. In one embodiment, during UE-initiated COT sharing, the UE may transmit the CCA indication during a scheduled uplink transmission.

Figure 9:
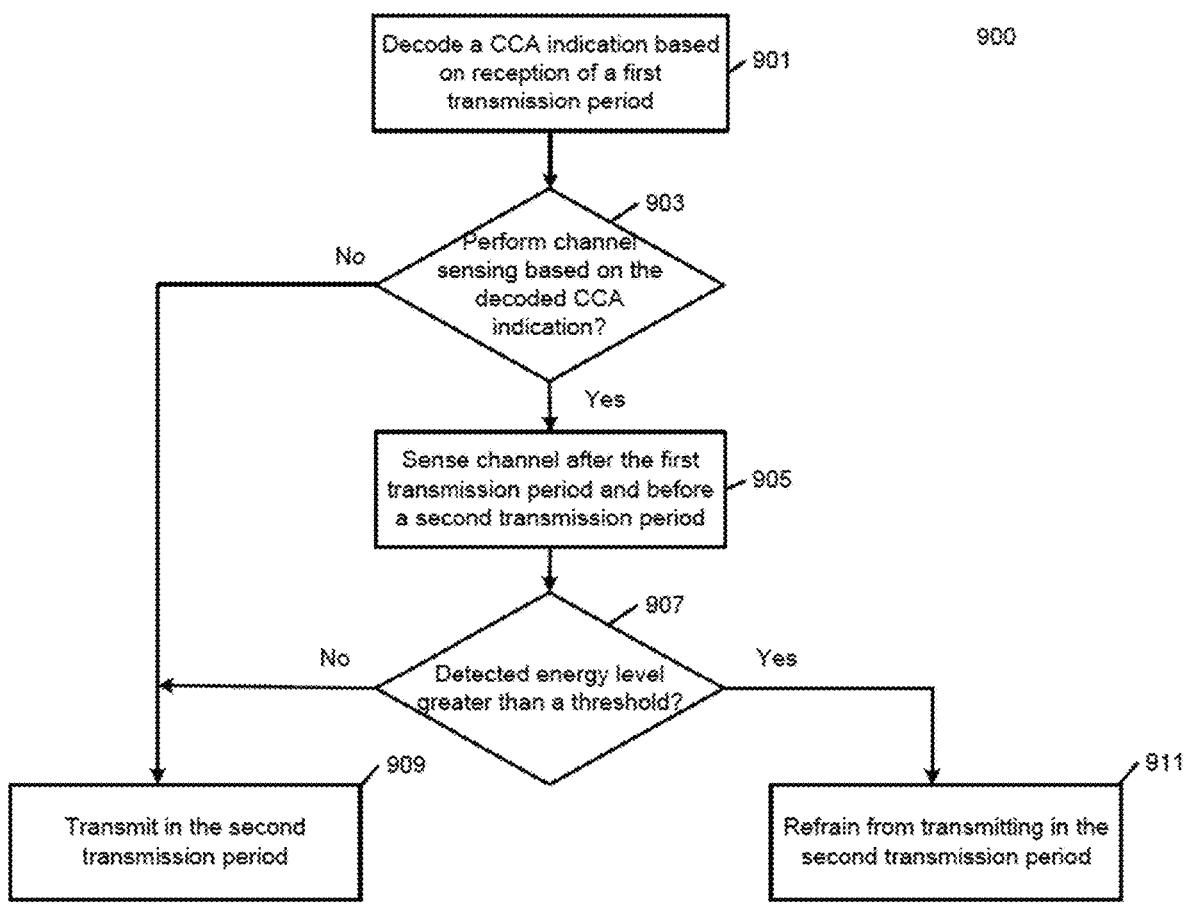
FIG. 9 is a flow diagram illustrating an example of a method for a device to decode a CCA indication received during a first transmission period to determine whether to perform channel sensing during the SIFS between the first transmission period and a second transmission period and to determine whether to transmit during the second transmission period in accordance with some embodiments of the disclosure.

FIG. 9 is a flow diagram illustrating an example of a method 900 for a device to decode a CCA indication received during a first transmission period to determine whether to perform channel sensing during the SIFS between the first transmission period and a second transmission period and to determine whether to transmit during the second transmission period in accordance with some embodiments of the disclosure. Method 900 may be performed by processing logic which may include software, hardware, or a combination thereof. For example, method 800 may be performed by processors 302 or cellular communication circuitry 330 of the UE 106, or by processors 404 of the base station 102 (e.g., gNB), such as described in conjunction with FIGS. 1-5.

At operation 901, the device decodes a CCA indication based on reception of a first transmission period. In one embodiment, device may be the UE and the first transmission period may be a downlink transmission from the gNB to the UE during a gNB-initiated COT sharing. The UE may receive the CCA indication inside the DCI used to schedule PUSCH. In one embodiment, the device may be the gNB and the first transmission period may be an uplink transmission from the UE to the gNB during a UE-initiated COT sharing. The CCA indication indicates whether the device is to perform channel sensing before the device transmits.

At operation 903, the device determines whether to perform channel sensing based on the decoded CCA indication. In one embodiment, the device may determine whether to perform channel sensing as a function of a scheduled transmission. For example, if the duration of the scheduled transmission is equal to or more than a threshold duration, the device may perform channel sensing. On the other hand, if the duration of the scheduled transmission is less than the threshold duration, the device may not perform channel sensing.

At operation 909, if the device does not perform channel sensing, the device transmits in a second transmission period. In one embodiment, device may be the UE and the second transmission period may be an uplink transmission from the UE to the gNB during a gNB-initiated COT sharing. In one embodiment, the device may be the gNB and the second transmission period may be a downlink transmission from the gNB to the UE during a UE-initiated COT sharing.

If the CCA indication indicates the device is to perform channel sensing, at operation 905, the device may perform channel sensing during an interval between the first transmission period and the second transmission period, such as during the SIFS interval between a downlink transmission and an uplink transmission or vice versa. In one embodiment, the SIFS interval may be 16 us. The device may perform channel sensing by listening to the channel intended for use by the second transmission period for a period of time, such as a single observation slot with a typical duration of 9 us within the SIFS interval. In one embodiment, the device may measure the detected RF energy level during the observation slot.

At operation 907, the device determines if the detected energy level is greater than an ED threshold. The detected energy level indicates the presence or absence of other signals on the channel, thus indicating whether the channel is occupied or clear. In one embodiment, the ED threshold may be predefined and configured by the device or by a second device.

If the detected energy level is greater than the ED threshold, the channel is occupied and the device may refrain from transmitting in the second transmission period at 911. Otherwise, the channel is clear and the device may transmit in the second transmission period at operation 909. Thus, by performing channel sensing as triggered by the CCA indication, the device may execute the LBT protocol to allow the device to coexist with incumbent systems operating in the unlicensed spectrum and with other networks.

Embodiments of the method and apparatus described herein for supporting reduced capability devices in a wireless network may be implemented in a data processing system, for example, by a network computer, network server, tablet computer, smartphone, laptop computer, desktop computer, other consumer electronic devices or other data processing systems. In particular, the operations described are digital signal processing operations performed by a processor that is executing instructions stored in one or more memories. The processor may read the stored instructions from the memories and execute the instructions to perform the operations described. These memories represent examples of machine readable non-transitory storage media that can store or contain computer program instructions which when executed cause a data processing system to perform the one or more methods described herein. The processor may be a processor in a local device such as a smartphone, a processor in a remote server, or a distributed processing system of multiple processors in the local device and remote server with their respective memories containing various parts of the instructions needed to perform the operations described.

While certain exemplary instances have been described and shown in the accompanying drawings, it is to be understood that these are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method for channel occupancy time (COT) sharing by a device of a wireless communication network, the method comprising:
    decoding, by the device, a clear channel assessment (CCA) indication received from a second device of the wireless communication network during a first transmission period;
    determining, by the device, whether the CCA indication asserts a channel sensing procedure;
    in response to determining that the CCA indication is asserted, performing by the device, the channel sensing procedure during a duration between the first transmission period and a second transmission period to determine whether a channel is idle; and
    based on whether the channel is determined to be idle, transmitting, by the device, to the second device during the second transmission period.

2. The method of claim 1, further comprising: transmitting, by the device, to the second device during the second transmission period in response to determining that the CCA indication is de-asserted.

3. The method of claim 1, further comprising: performing the channel sensing procedure to determine whether the channel is idle when a duration of the second transmission period satisfies a threshold duration.

4. The method of claim 1, wherein the device performs the transmitting to the second device during the second transmission period without performing the channel sensing procedure when the duration of the second transmission period fails to satisfy a threshold duration.

5. The method of claim 1, wherein performing the channel sensing procedure includes detecting whether an energy level in the channel satisfies a threshold.

6. The method of claim 1, wherein transmitting to the second device during the second transmission period is performed when the channel is determined to be idle.

7. A method for channel occupancy time (COT) sharing by a device of a wireless communication network, the method comprising:
    generating, by the device, a clear channel assessment (CCA) indication, the CCA indication indicating whether a second device of the wireless communication network is to perform a channel sensing procedure to detect that a channel is idle during a duration between a first transmission period and a second transmission period, wherein the first transmission period is used by the device to transmit to the second device, and the second transmission period is used by the device to receive from the second device; and
    transmitting, by the device, the CCA indication to the second device during the first transmission period.

8. The method of claim 7, further comprising receiving a transmission from the second device in the second transmission period, wherein the second device transmits to the device during the second transmission period in response to detecting that the sensed channel is idle.

9. The method of claim 8, wherein the second device refrains from transmitting to the device in the second transmission period in response to detecting that the sensed channel is not idle.

10. The method of claim 7, wherein the device comprises a base station of the wireless communication network and wherein transmitting the CCA indication to the second device during the first transmission period comprises transmitting the CCA indication inside of downlink channel information used to schedule uplink transmission by the second device.

11. The method of claim 7, wherein the device comprises a user station of the wireless communication network, the second device comprises a base station of the wireless communication network, and wherein generating by the user station the CCA indication comprises receiving by the user station the CCA indication inside of downlink channel information used to schedule downlink transmission by the base station.

12. The method of claim 7, wherein generating the CCA indication comprises asserting the CCA indication when a duration of the second transmission period satisfies a threshold duration.

13. The method of claim 7, wherein generating the CCA indication comprises de-asserting the CCA indication when the duration of the second transmission period fails to satisfy a threshold duration.

14. The method of claim 7, wherein generating the CCA indication comprises de-asserting the CCA indication when the CCA indication has been asserted in an interval having a duration prior to the first transmission period.

15. The method of claim 7, wherein the device comprises a user station of the wireless communication network, the second device comprises a base station of the wireless communication network, and wherein the method further comprises transmitting by the user station to the base station during the first transmission period, information associated with a transmit power used in an uplink transmission from the user station to the base station.

16. A device of a wireless communication network, comprising:
    at least one antenna;
    at least one radio, wherein the at least one radio is configured to communicate with a second device of the wireless communication network using the at least one antenna; and
    at least one processor coupled to the at least one radio, wherein the at least one processor is configured to perform operations for channel occupancy time (COT) sharing comprising:
        decoding a clear channel assessment (CCA) indication received from the second device during a first transmission period;
        determining whether the CCA indication asserts a channel sensing procedure;
        performing the channel sensing procedure to if a channel is idle during an interval between the first transmission period and a second transmission period in response to determining that the CCA indication is asserted; and based on whether the channel is determined to be idle, transmitting, by the device, to the second device during the second transmission period.

17. The device of claim 16, wherein the operations for the COT sharing further comprises:
transmitting to the second device during the second transmission period in response to determining that the CCA indication is de-asserted.

18. The device of claim 16, wherein the operations for the COT sharing further comprises:
performing the channel sensing procedure to detect if the channel is idle when a duration of the second transmission period satisfies a threshold duration.

19. The device of claim 16, wherein the operations for the COT sharing further comprises: transmitting to the second device during the scheduled second transmission period without performing the channel sensing procedure when a duration of the scheduled second transmission period fails to satisfy a threshold duration.

20. The device of claim 16, wherein transmitting to the second device during the second transmission period is performed when the channel is determined to be idle.

* * * * *